United States Patent
Lin et al.

(10) Patent No.: US 9,449,919 B2
(45) Date of Patent: Sep. 20, 2016

(54) SEMICONDUCTOR DEVICE, LAYOUT DESIGN AND METHOD FOR MANUFACTURING A SEMICONDUCTOR DEVICE

(71) Applicant: TAIWAN SEMICONDUCTOR MANUFACTURING COMPANY, LTD., Hsinchu (TW)

(72) Inventors: Jian-Hong Lin, Yunlin County (TW); Hsin-Chun Chang, Taipei (TW); Shiou-Fan Chen, Hsinchu (TW); Chwei-Ching Chiu, Hsinchu (TW); Yung-Huei Lee, New Taipei (TW)

(73) Assignee: TAIWAN SEMICONDUCTOR MANUFACTURING COMPANY, LTD. (TW)

( * ) Notice: Subject to any disclaimer, the term of this patent is extended or adjusted under 35 U.S.C. 154(b) by 0 days.

(21) Appl. No.: 14/621,067

(22) Filed: Feb. 12, 2015

(65) Prior Publication Data
US 2016/0240472 A1    Aug. 18, 2016

(51) Int. Cl.
*H01L 23/528* (2006.01)
*H01L 23/522* (2006.01)
*G06F 17/50* (2006.01)
*H01L 21/768* (2006.01)

(52) U.S. Cl.
CPC ......... *H01L 23/528* (2013.01); *G06F 17/5077* (2013.01); *H01L 21/76802* (2013.01); *H01L 21/76879* (2013.01); *H01L 21/76883* (2013.01); *H01L 23/5226* (2013.01)

(58) Field of Classification Search
None
See application file for complete search history.

(56) References Cited

U.S. PATENT DOCUMENTS

| | | | | |
|---|---|---|---|---|
| 5,760,674 A * | 6/1998 | Gilmour | ............. | H01L 23/5258 257/529 |
| 5,977,599 A * | 11/1999 | Adrian | ............. | H01L 21/76885 257/382 |
| 7,956,384 B2 * | 6/2011 | Mallikararjunaswamy | ............. | H01L 27/0207 257/203 |
| 8,222,513 B2 * | 7/2012 | Luch | ................. | H01L 31/02008 136/244 |
| 8,816,403 B2 * | 8/2014 | Chen | ................... | H01L 27/0207 257/207 |
| 9,105,637 B2 * | 8/2015 | Filippi | ................ | H01L 23/5252 |
| 2015/0348905 A1 * | 12/2015 | Tsai | .................. | H01L 21/76898 257/774 |
| 2015/0348917 A1 * | 12/2015 | Tsai | .................. | H01L 21/76898 257/774 |

* cited by examiner

*Primary Examiner* — Thao P Le
(74) *Attorney, Agent, or Firm* — Hauptman Ham, LLP

(57) ABSTRACT

A semiconductor device includes a first interconnect structure. The first interconnect structure includes a first interconnect portion, a second interconnect portion and a third interconnect portion. The first interconnect portion has a width and a length. The second interconnect portion has a width less than the length of the first interconnect portion. The second interconnect portion is connected to the first interconnect portion. The third interconnect portion has a width less than the width of the second interconnect portion. The third interconnect portion is connected to the second interconnect portion.

20 Claims, 8 Drawing Sheets

SEMICONDUCTOR DEVICE, LAYOUT DESIGN AND METHOD FOR MANUFACTURING A SEMICONDUCTOR DEVICE

BACKGROUND

The recent trend in miniaturizing integrated circuits (ICs) has resulted in smaller devices which consume less power yet provide more functionality at higher speeds. However, the miniaturization process has also resulted in stricter design and manufacturing specifications as well as reliability challenges. For one or more of these advantages to be realized, various developments in IC design and/or manufacture are considered. Stress Migration (SM) is a failure mechanism that occurs in integrated circuit metallization from the formation of voids between grain boundaries. As IC's are further reduced in size, new SM failure modes in interconnect structures are discovered affecting IC performance and/or reliability.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
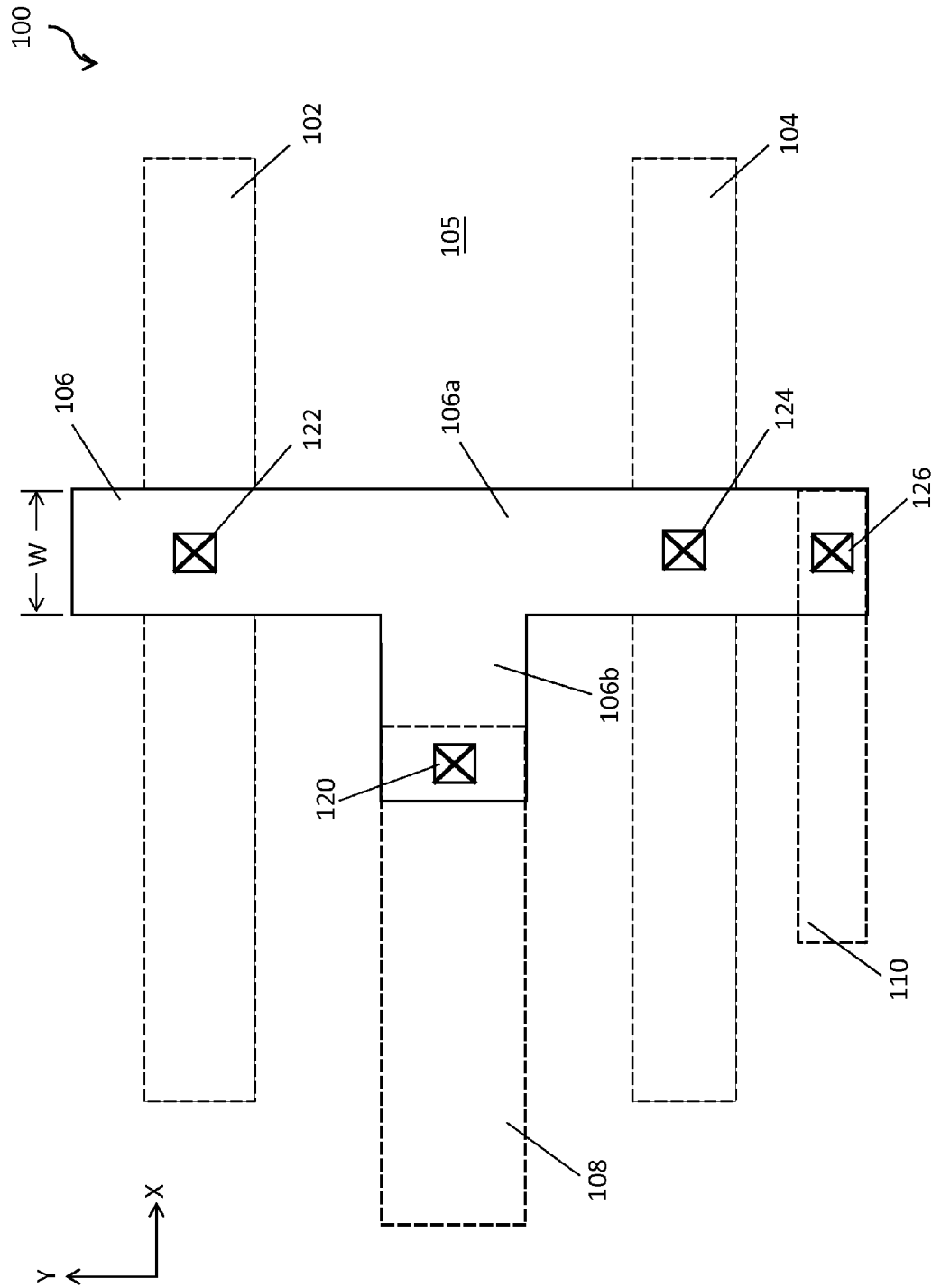
FIG. 1 is a top view of a semiconductor device in accordance with one or more embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A semiconductor device includes a first interconnect structure. The first interconnect structure includes a first interconnect portion, a second interconnect portion and a third interconnect portion. The first interconnect portion has a width and a length. The second interconnect portion has a width less than the length of the first interconnect portion. The second interconnect portion is connected to the first interconnect portion. The third interconnect portion has a width less than the width of the second interconnect portion. The third interconnect portion is connected to the second interconnect portion.

FIG. 1 is a top view of a semiconductor device 100 in accordance with one or more embodiments. Semiconductor device 100 includes a first structure 102 connected to a second structure 104 by a first interconnect structure 106. Semiconductor device 100 also includes a second interconnect structure 108 and a third interconnect structure 110 connected to the first interconnect structure 106. In some embodiments, first interconnect structure 106 is connected to second interconnect structure 108 by first conductive line 120. First interconnect structure 106 is connected to first structure 102 by second conductive line 122. First interconnect structure 106 is connected to second structure 104 by third conductive line 124. In some embodiments, first interconnect structure 106 is connected to third interconnect structure 110 by fourth conductive line 126. Semiconductor device 100 also includes an isolation region 105 which is located outside at least the area defined by first structure 102 and second structure 104.

First structure 102 is at least a portion of a circuit element. In some embodiments, first structure 102 includes one or more oxide diffusion (OD) regions. The OD region refers to an active area of a substrate. In some embodiments, first structure 102 includes one or more polysilicon structures. In some embodiments, first structure 102 is a whole circuit element. In some embodiments, first structure 102 is a lower or higher level of an interconnect structure. In some embodiments, first structure 102 includes one or more active elements and/or passive elements. Examples of active elements include, but are not limited to, transistors and diodes. Examples of transistors include, but are not limited to, metal oxide semiconductor field effect transistors (MOSFET), complementary metal oxide semiconductor (CMOS) transistors, bipolar junction transistors (BJT), high voltage transistors, high frequency transistors, p-channel and/or n-channel field effect transistors (PFETs/NFETs), etc.), FinFETs, and planar MOS transistors with raised source/drains. Examples of passive elements include, but are not limited to, capacitors, inductors, fuses, and resistors. First structure 102 is configured to extend along a direction X. First structure 102 is connected to first interconnect structure 106 by second conductive line 122.

Second structure 104 is at least a portion of a circuit element. In some embodiments, second structure 104 includes one or more OD regions. In some embodiments, second structure 104 includes one or more polysilicon structures. In some embodiments, second structure 104 is a whole circuit element. In some embodiments, second structure 104 includes a lower or higher layer of an interconnect structure. In some embodiments, second structure 104 includes one or more active elements and/or passive elements. Second structure 104 is configured to extend along direction X. Second structure 104 is connected to first interconnect structure 106 by third conductive line 124.

Isolation region 105 is located outside at least the area defined by first structure 102 and second structure 104. Isolation region 105 surrounds at least first structure 102 or second structure 104. In some embodiments, at least one of first structure 102 or second structure 104 is non-overlapping with isolation region 105.

First interconnect structure 106 includes a first interconnect portion 106a and a second interconnect portion 106b.

First interconnect structure 106 is configured to connect first structure 102 and second structure 104. First interconnect structure 106 is connected to second interconnect structure 108. In some embodiments, first interconnect structure 106 is connected to second interconnect structure 108 by first conductive line 120. In some embodiments, first interconnect structure 106 is directly connected to second interconnect structure 108 (e.g., without first conductive line 120). First interconnect structure 106 is connected to third interconnect structure 110. In some embodiments, first interconnect structure 106 is connected to third interconnect structure 110 by fourth conductive line 126. In some embodiments, first interconnect structure 106 is directly connected to third interconnect structure 110 (e.g., without fourth conductive line 126).

First interconnect structure 106 is over first structure 102 or second structure 104. In some embodiments, first interconnect structure 106 overlaps first structure 102 or second structure 104. In some embodiments, first interconnect structure 106 is configured to extend in direction X. In some embodiments, first interconnect structure 106 is configured to extend in direction Y. In some embodiments, first interconnect structure 106 overlaps second interconnect structure 108 or third interconnect structure 110. In some embodiments, first interconnect structure 106 is located on a same interconnect layer as second interconnect structure 108 or third interconnect structure 110. Elements on a same interconnect layer are spaced from a top surface of a substrate by a substantially equal distance. In some embodiments, first interconnect structure 106 is located on a different interconnect layer from second interconnect structure 108 or third interconnect structure 110. In some embodiments, first interconnect structure 106 is separated from second interconnect structure 108 or third interconnect structure 110 by one or more layers.

In some embodiments, first interconnect structure 106 is arranged in a T-shape or an L-shape. In some embodiments, first interconnect structure 106 is arranged in a comb-shape such that first interconnect structure 106 includes one or more side portions (e.g., second interconnect portion 106b) connected to a central portion (e.g., first interconnect portion 106a). In some embodiments, the one or more side portions (e.g., first interconnect portion 106a) extend from the central portion (e.g., first interconnect portion 106a) in direction X. In some embodiments, the one or more side portions (e.g., second interconnect portion 106b) are arranged in a parallel configuration.

First interconnect structure 106 includes a conductive material. In some embodiments, first interconnect structure 106 includes a metal. In some embodiments, first interconnect structure 106 includes copper, aluminum, nickel, titanium, tungsten, alloys thereof or another suitable conductive material. In some embodiments, first interconnect structure 106 includes one or more conductive portions. In some embodiments, first interconnect structure 106 is configured as a data line to carry a data signal. In some embodiments, first interconnect structure 106 is configured as a power line to carry a power supply voltage or a ground reference voltage.

First interconnect portion 106a is configured to connect first structure 102 and second structure 104. First interconnect portion 106a and second interconnect portion 106b are connected to second interconnect structure 108. In some embodiments, first interconnect portion 106a is connected to second interconnect structure 108 by second interconnect portion 106b and first conductive line 120. In some embodiments, first interconnect portion 106a is connected to second interconnect structure 108 (e.g., without first conductive line 120) by second interconnect portion 106b. First interconnect portion 106a is connected to third interconnect structure 110. In some embodiments, first interconnect portion 106a is connected to third interconnect structure 110 by fourth conductive line 126.

First interconnect portion 106a is over first structure 102 or second structure 104. In some embodiments, first interconnect portion 106a overlaps first structure 102 or second structure 104. First interconnect portion 106a is configured to extend in direction Y perpendicular to direction X. First interconnect portion 106a has a first width W measurable along the direction X.

In some embodiments, first interconnect portion 106a overlaps third interconnect structure 110. In some embodiments, first interconnect portion 106a is located on a same interconnect layer as second interconnect structure 108 or third interconnect structure 110. In some embodiments, first interconnect portion 106a is located on a different interconnect layer from second interconnect structure 108 or third interconnect structure 110. In some embodiments, first interconnect portion 106a is separated from second interconnect structure 108 or third interconnect structure 110 by one or more layers.

In some embodiments, first interconnect portion 106a includes a conductive material. In some embodiments, first interconnect portion 106a includes a metal. In some embodiments, first interconnect portion 106a includes copper, aluminum, nickel, titanium, tungsten, alloys thereof or another suitable conductive material. In some embodiments, first interconnect portion 106a includes one or more conductive portions.

Second interconnect portion 106b is directly connected to first interconnect portion 106a. Second interconnect portion 106b is located on the same interconnect layer as first interconnect portion 106a. In some embodiments, second interconnect portion 106b and first interconnect portion 106a are integrally formed. In some embodiments, second interconnect portion 106b and first interconnect portion 106a are referred to as a nose structure. In some embodiments, second interconnect portion 106b is referred to as a branch line structure. In some embodiments, first interconnect portion 106a and second interconnect portion 106b are arranged in a T-shape or an L-shape. In some embodiments, first interconnect portion 106a and second interconnect portion 106b are arranged in a comb-shape such that two or more second interconnect portions 106b are connected to a side of first interconnect portion 106a. In some embodiments, one or more second interconnect portions 106b are connected to a first side of first interconnect portion 106a, and one or more second interconnect portions 106b are connected to a second side of first interconnect portion 106a. In some embodiments, the first side is an opposite side of first interconnect portion 106a from the second side. In some embodiments, one or more second interconnect portions 106b extend from the first interconnect portion 106a in direction X or direction −X. In some embodiments, two or more second interconnect portions 106b are arranged in a parallel configuration.

In some embodiments, second interconnect portion 106b is connected to second interconnect structure 108 by first conductive line 120. In some embodiments, second interconnect portion 106b is directly connected to second interconnect structure 108 (e.g., without first conductive line 120). Second interconnect portion 106b is directly connected to third interconnect structure 110 by first interconnect portion 106a. In some embodiments, second interconnect portion 106b and first interconnect portion 106a are connected to third interconnect structure 110 by fourth conductive line 126.

Second interconnect portion 106b is over first structure 102 or second structure 104. In some embodiments, second interconnect portion 106b overlaps first structure 102 or second structure 104. Second interconnect portion 106b is configured to extend in direction X from a side of first interconnect portion 106a. In some embodiments, second interconnect portion 106b overlaps second interconnect structure 108. In some embodiments, second interconnect portion 106b is located on a same interconnect layer as second interconnect structure 108 or third interconnect structure 110. In some embodiments, second interconnect portion 106b is located on a different interconnect layer from second interconnect structure 108 or third interconnect structure 110. In some embodiments, second interconnect portion 106b is separated from second interconnect structure 108 or third interconnect structure 110 by one or more layers.

In some embodiments, second interconnect portion 106b includes a conductive material. In some embodiments, second interconnect portion 106b includes a metal. In some embodiments, second interconnect portion 106b includes copper, aluminum, nickel, titanium, tungsten, alloys thereof or another suitable conductive material. In some embodiments, second interconnect portion 106b includes one or more conductive portions.

Second interconnect structure 108 is over first structure 102 or second structure 104. In some embodiments, second interconnect structure 108 overlaps first structure 102 or second structure 104. In some embodiments, second interconnect structure 108 is configured to extend in direction X. In some embodiments, second interconnect structure 108 is configured to extend in direction Y. In some embodiments, second interconnect structure 108 overlaps first interconnect structure 106. In some embodiments, second interconnect structure 108 is located on a same interconnect layer as third interconnect structure 110. In some embodiments, second interconnect structure 108 is located on a different interconnect layer as third interconnect structure 110. In some embodiments, second interconnect structure 108 is separated from first interconnect structure 106 or third interconnect structure 110 by one or more layers. In some embodiments, second interconnect structure 108 is arranged in a parallel configuration with first structure 102, second structure 104 or third interconnect structure 110.

In some embodiments, second interconnect structure 108 includes a conductive material. In some embodiments, second interconnect structure 108 includes a metal. In some embodiments, second interconnect structure 108 includes copper, aluminum, nickel, titanium, tungsten, alloys thereof or another suitable conductive material. In some embodiments, second interconnect structure 108 includes one or more conductive portions. In some embodiments, second interconnect structure 108 is the same material as first interconnect structure 106. In some embodiments, second interconnect structure 108 is configured as a data line to carry a data signal. In some embodiments, second interconnect structure 108 is configured as a power line to carry a power supply voltage or a ground reference voltage.

Third interconnect structure 110 is over first structure 102 or second structure 104. In some embodiments, third interconnect structure 110 overlaps first structure 102 or second structure 104. In some embodiments, third interconnect structure 110 is configured to extend in direction X. In some embodiments, third interconnect structure 110 is configured to extend in direction Y. In some embodiments, third interconnect structure 110 overlaps first interconnect structure 106 or second interconnect structure 108. In some embodiments, third interconnect structure 110 is separated from second interconnect structure 108 or first interconnect structure 106 by one or more layers.

In some embodiments, third interconnect structure 110 includes a conductive material. In some embodiments, third interconnect structure 110 includes a metal. In some embodiments, third interconnect structure 110 includes copper, aluminum, nickel, titanium, tungsten, alloys thereof or another suitable conductive material. In some embodiments, third interconnect structure 110 includes one or more conductive portions. In some embodiments, third interconnect structure 110 is configured as a data line to carry a data signal. In some embodiments, third interconnect structure 110 is configured as a power line to carry a power supply voltage or a ground reference voltage.

First conductive line 120 is configured to provide an electrical connection between second interconnect structure 108 and first interconnect structure 106. In some embodiments, first conductive line 120 is a metal line, a via, a through silicon via (TSV), an inter-level via (ILV), a slot via, an array of vias, or another suitable conductive line. In some embodiments, first conductive line 120 includes copper, aluminum, nickel, titanium, tungsten, cobalt, carbon, alloys thereof or another suitable conductive material. In some embodiments, first conductive line 120 includes one or more conductive line portions. In some embodiments, first conductive line 120 is over the first interconnect structure 106. In some embodiments, first conductive line 120 is below the first interconnect structure 106.

Second conductive line 122 is configured to provide an electrical connection between first structure 102 and first interconnect structure 106. In some embodiments, second conductive line 122 is a contact plug, a metal line, a via, a TSV, an ILV, a slot via, an array of vias, or another suitable conductive line. In some embodiments, second conductive line 122 includes copper, aluminum, nickel, titanium, tungsten, cobalt, carbon, alloys thereof or another suitable conductive material. In some embodiments, second conductive line 122 includes one or more conductive portions. Second conductive line 122 is below the first interconnect structure 106.

Third conductive line 124 is configured to provide an electrical connection between second structure 104 and first interconnect structure 106. In some embodiments, third conductive line 124 is a contact plug, a metal line, a via, a TSV, an ILV, a slot via, an array of vias, or another suitable conductive line. In some embodiments, third conductive line 124 includes copper, aluminum, nickel, titanium, tungsten, cobalt, carbon, alloys thereof or another suitable conductive material. In some embodiments, third conductive line 124 includes one or more conductive line portions. Third conductive line 124 is below the first interconnect structure 106. Fourth conductive line 126 is configured to provide an electrical connection between third interconnect structure 110 and first interconnect structure 106. In some embodiments, fourth conductive line 126 is a contact plug, a metal line, a via, a TSV, an ILV, a slot via, an array of vias, or another suitable conductive line. In some embodiments, fourth conductive line 126 includes copper, aluminum, nickel, titanium, tungsten, cobalt, carbon, alloys thereof or another suitable conductive material. In some embodiments, fourth conductive line 126 includes one or more conductive line portions. In some embodiments, fourth conductive line 126 is over the first interconnect structure 106. In some embodiments, fourth conductive line 126 is below the first interconnect structure 106.

Figure 2:
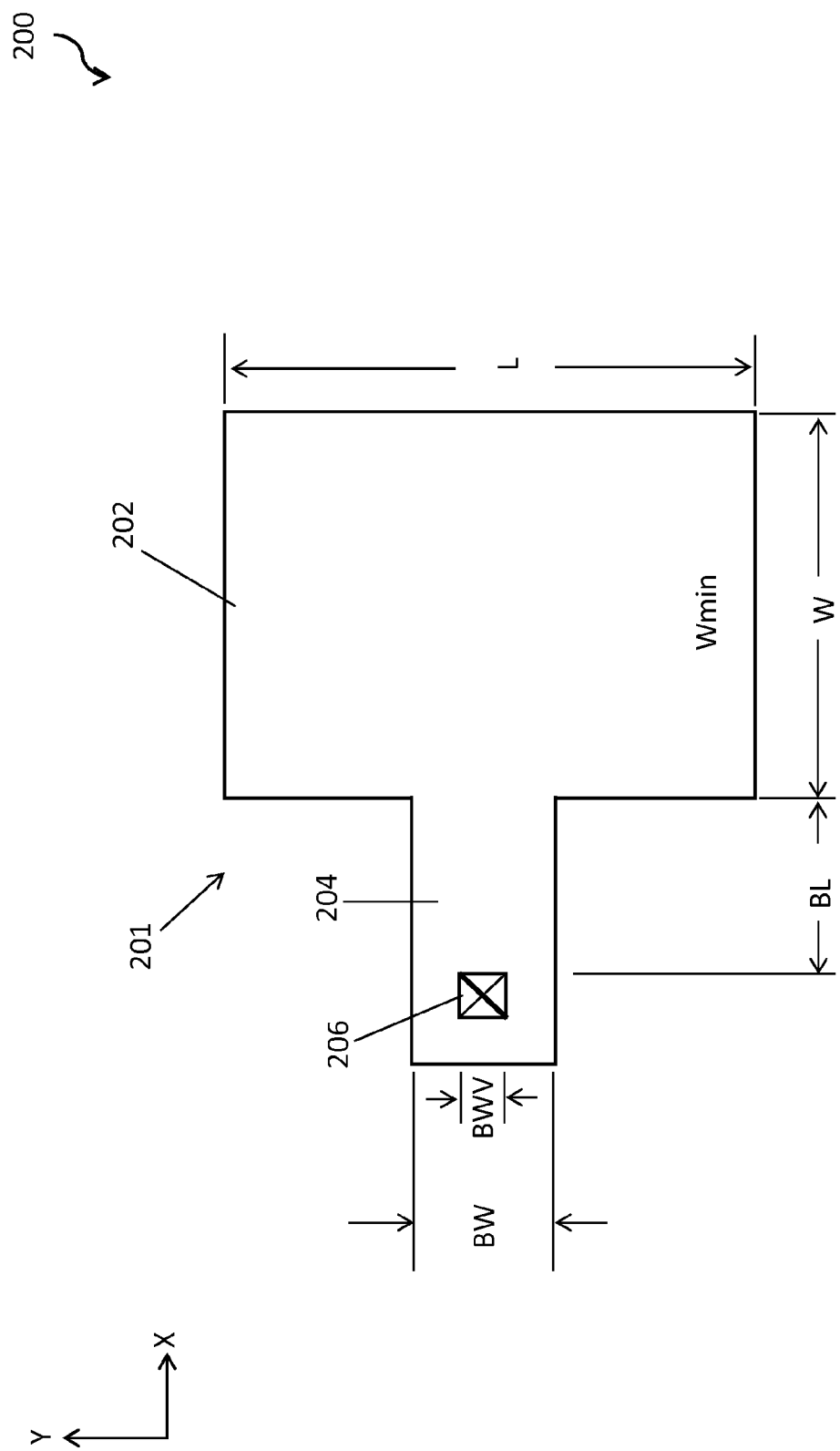
FIG. 2 is a portion of a layout diagram of a semiconductor device in accordance with one or more embodiments.

FIG. 2 is a portion of a layout diagram 200 of a semiconductor device in accordance with one or more embodiments. In some embodiments, first interconnect structure 201 is an embodiment of first interconnect structure 106 shown in FIG. 1. In some embodiments, first interconnect portion 202 is an embodiment of first interconnect portion 106a shown in FIG. 1. In some embodiments, second interconnect portion 204 is an embodiment of second interconnect portion 106b shown in FIG. 1. In some embodiments, first conductive line 206 is an embodiment of first conductive line 120 shown in FIG. 1. Although not shown with the architecture of layout diagram 200, the architecture of FIG. 2 is sufficient to make each of the structures independently shown in semiconductor device 100 of FIG. 1 and the like. A person having ordinary skill in the art would appreciate that one or more of the layout patterns described herein is usable to prepare a set of masks, that are in turn usable for manufacturing a semiconductor device. The layout diagram 200 of the semiconductor device 100 is a basis to be modified to form other layout structures, such as those described herein, e.g., FIGS. 3-5.

First interconnect portion 202 is configured to extend in direction Y. First interconnect portion 202 has a first length L measurable along direction Y. First interconnect portion 202 has a first width W measurable along the direction X.

First interconnect portion 202 has a minimum design width Wmin measurable along the direction X. The minimum design width Wmin is the minimum width of the first interconnect portion 202 capable of being reliably manufactured for a given technology node size and a consistent manufacturing yield. In some embodiments, the minimum design width Wmin is defined by a foundry. In some embodiments, the minimum design width Wmin is defined by a design rule. The minimum design width Wmin is defined based upon the technology node size. For example, as technology nodes sizes are reduced, the minimum design width Wmin is also reduced.

In some embodiments, first width W is greater than minimum width Wmin. In some embodiments, the first width W is at least greater than six times a minimum design width Wmin of the first interconnect portion 202 as expressed by formula 1.

The first width, W, of first interconnect portion 202 is expressed by formula 1:

$$W \geq 6*Wmin \tag{1}$$

where W is the width of the first interconnect portion 202 and Wmin is the minimum design width of the first interconnect portion 202.

Second interconnect portion 204 has a width BW measurable along direction Y. Second interconnect portion 204 has a length BL measurable along direction X. In some embodiments, the length BL is measurable along direction X from an edge of first interconnect portion 202 to an edge of first conductive line 206. In some embodiments, where a conductive line (e.g., first conductive line 206) is not directly connected to second interconnect portion 204, the length BL is measurable along direction X from an edge of first interconnect portion 202 to an edge of first conductive line 206. The width BW of second interconnect portion 204 is less than the first length L of first interconnect portion 202. In some embodiments, the width BW is at least greater than 1.5 times the minimum design width Wmin of the first interconnect portion 202 as expressed by formula 2.

The width BW of second interconnect portion 204 is expressed by formula 2:

$$BW \geq 1.5*Wmin \tag{2}$$

where BW is the width of the second interconnect portion 204 and Wmin is the minimum design width of the first interconnect portion 202.

First conductive line 206 has a via width BWV measurable along direction Y. In some embodiments, the via width BWV of first conductive line 206 is less than the width BW of second interconnect portion 204. In some embodiments, the via width BWV of first conductive line 206 is equal to the width BW of second interconnect portion 204.

Figure 3:
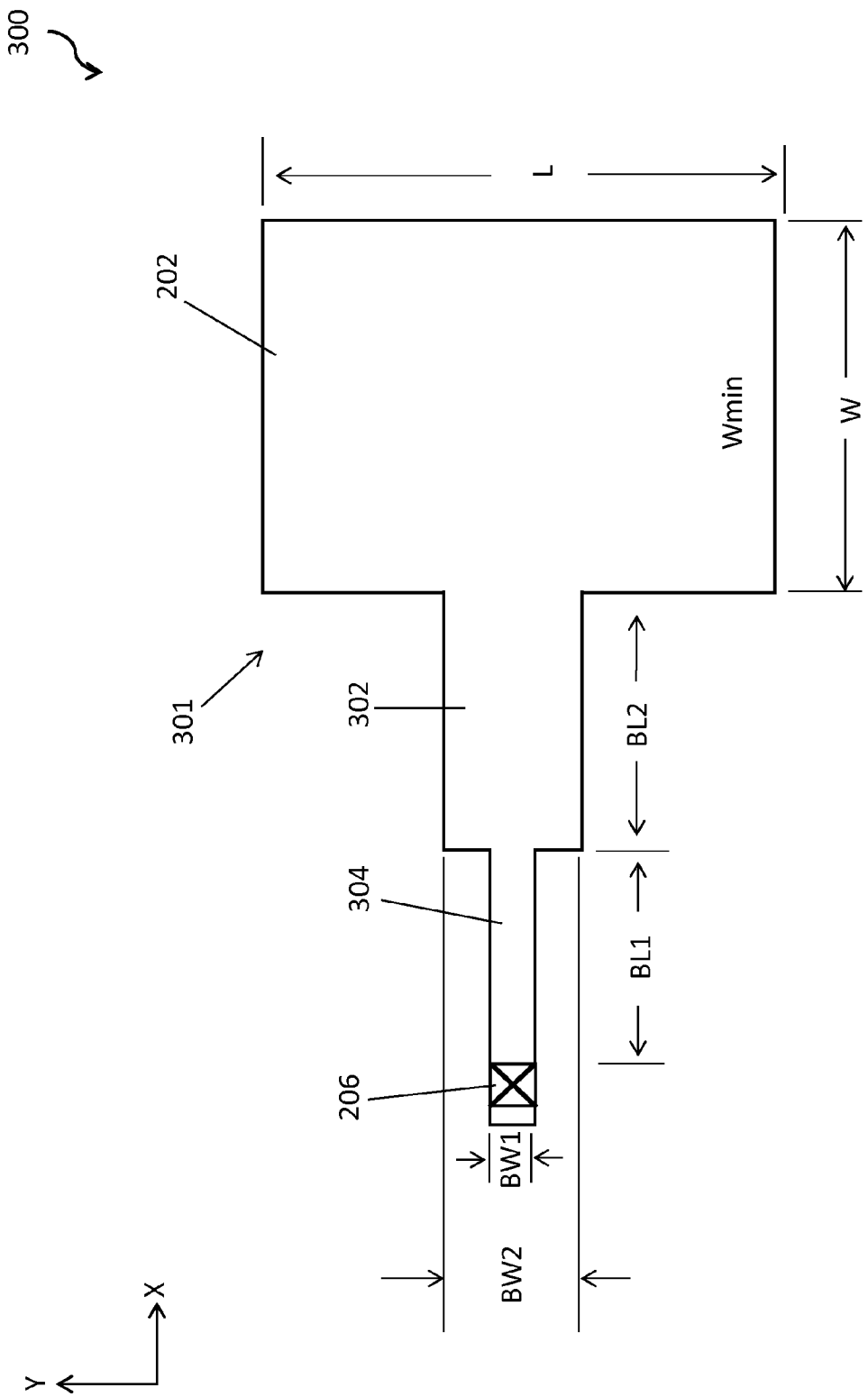
FIG. 3 is a portion of a layout diagram of a semiconductor device in accordance with one or more embodiments.

FIG. 3 is a portion of a layout diagram 300 of a semiconductor device in accordance with one or more embodiments. In some embodiments, layout diagram 300 is an embodiment of layout diagram 200 shown in FIG. 2. As shown in FIG. 3, similar elements have a same reference number as shown in FIG. 2. In comparison with layout diagram 200 (shown in FIG. 2), layout diagram 300 also includes third interconnect portion 304. In some embodiments, first interconnect structure 301 is first interconnect structure 106 in FIG. 1. In some embodiments, first interconnect structure 301 is first interconnect structure 201 in FIG. 2.

First interconnect structure 301 comprises first interconnect portion 202, second interconnect portion 302 and third interconnect portion 304.

In some embodiments, first interconnect portion 202 is first interconnect portion 106a in FIG. 1. In some embodiments, second interconnect portion 302 is second interconnect portion 106b in FIG. 1. In some embodiments, second interconnect portion 302 is second interconnect portion 204 in FIG. 2. In some embodiments, third interconnect portion 304 is second interconnect portion 106b in FIG. 1. In some embodiments, first conductive line 206 is first conductive line 120 in FIG. 1. Although not shown with the architecture of layout diagram 300, the architecture of FIG. 3 is sufficient to make each of the structures independently shown in layout diagram 100 of FIG. 1 and the like.

Second interconnect portion 302 has a width BW2 measurable along direction Y. In some embodiments, the width BW2 of second interconnect portion 302 is less than the first length L of first interconnect portion 202. In some embodiments, the width BW2 is at least greater than 1.5 times the minimum design width Wmin of the first interconnect portion 202 as expressed by formula 3.

The width, BW2, of second interconnect portion 302 is expressed by formula 3:

$$BW2 \geq 1.5*Wmin \tag{3}$$

where BW2 is the width of the second interconnect portion 302 and Wmin is the minimum design width of the first interconnect portion 202.

Second interconnect portion 302 has a length BL2 measurable along direction X from a side of second interconnect portion 302 to a side of first interconnect portion 202. In some embodiments, the length BL2 is at least greater than one-third of the first width W of the first interconnect portion 202 as expressed by formula 4.

The length, BL2, of second interconnect portion 302 is expressed by formula 4:

$$BL2 \geq W/3 \qquad (4)$$

where BL2 is the length of the second interconnect portion 302 and W is the width of the first interconnect portion 202.

Third interconnect portion 304 is directly connected to second interconnect portion 302. Third interconnect portion 304 is located on the same interconnect layer as first interconnect portion 202 and second interconnect portion 302. In some embodiments, third interconnect portion 304, second interconnect portion 302 and first interconnect portion 202 are integrally formed. In some embodiments, third interconnect portion 304, second interconnect portion 302 and first interconnect portion 202 are referred to as a nose structure. In some embodiments, third interconnect portion 304 and second interconnect portion 302 are referred to as a branch line structure. In some embodiments, third interconnect portion 304, second interconnect portion 302 and first interconnect portion 202 are arranged in a T-shape or an L-shape. In some embodiments, one or more second interconnect portions 302 and a corresponding third interconnect portion 304 extend from the first interconnect portion 202 in direction X. In some embodiments, third interconnect portion 304, second interconnect portion 302 and first interconnect portion 202 are arranged in a comb-shape such that two or more third interconnect portions 304 and corresponding second interconnect portions 302 are connected to a side of first interconnect portion 202. In some embodiments, one or more second interconnect portions 302 and a corresponding third interconnect portion 304 are connected to a first side of first interconnect portion 202, and one or more second interconnect portions 302 and a corresponding third interconnect portion 304 are connected to a second side of first interconnect portion 202. In some embodiments, the first side is an opposite side of first interconnect portion 202 from the second side. In some embodiments, one or more second interconnect portions 302 and a corresponding third interconnect portion 304 are connected to a first side of first interconnect portion 202, and one or more second interconnect portions 302 is connected to a first side or a second side of first interconnect portion 202. In some embodiments, two or more second interconnect portions 302 and corresponding third interconnect portions 304 are arranged in a parallel configuration.

Third interconnect portion 304 is configured to connect both first interconnect portion 202 and second interconnect portion 302 to other structures (e.g., second interconnect structure 108 shown in FIG. 1). In some embodiments, third interconnect portion 304 is connected to other structures (e.g., second interconnect structure 108 shown in FIG. 1) by first conductive line 206. In some embodiments, third interconnect portion 304 is directly connected to other structures (e.g., second interconnect structure 108 shown in FIG. 1) without first conductive line 206. In some embodiments, third interconnect portion 304 overlaps other structures (e.g., second interconnect structure 108 shown in FIG. 1). In some embodiments, other structures (e.g., second interconnect structure 108 shown in FIG. 1) overlap third interconnect portion 304.

Third interconnect portion 304 is configured to extend in direction X. Third interconnect portion 304 has a width BW1 measurable along direction Y. Third interconnect portion 304 has a length BL1 measurable along direction X. In some embodiments, the length BL1 is measurable along direction X from a side of second interconnect portion 302 to a side of first conductive line 206.

In some embodiments, where a conductive line (e.g., first conductive line 206) is not directly connected to third interconnect portion 304, the length BL1 is measurable along direction X from a side of second interconnect portion 302 to a side of first conductive line 206. Width BW1 of third interconnect portion 304 is less than the width BW2 of third interconnect portion 302. In some embodiments, the width BW1 of third interconnect portion 304 is equal to the via width BWV (shown in FIG. 2) of first conductive line 206.

In some embodiments, third interconnect portion 304 includes a conductive material. In some embodiments, third interconnect portion 304 includes a metal. In some embodiments, third interconnect portion 304 includes copper, aluminum, nickel, titanium, tungsten, alloys thereof or another suitable conductive material. In some embodiments, third interconnect portion 304 includes one or more conductive portions.

Figure 4:
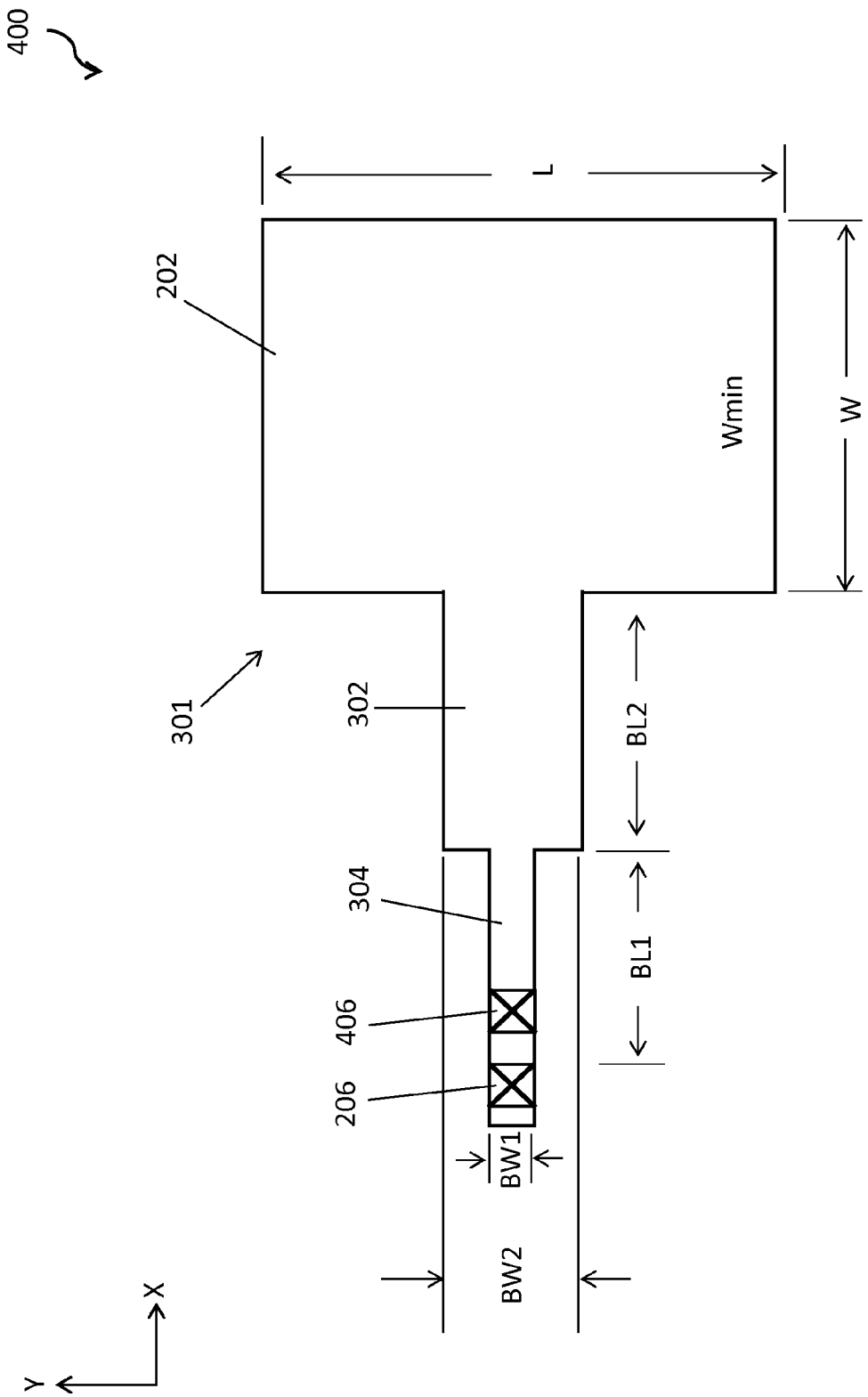
FIG. 4 is a portion of a layout diagram of a semiconductor device in accordance with one or more embodiments.

FIG. 4 is a portion of a layout diagram 400 of a semiconductor device in accordance with one or more embodiments. In some embodiments, layout diagram 400 is layout diagram 200 in FIG. 2. In some embodiments, layout diagram 400 is layout diagram 300 in FIG. 3. As shown in FIG. 4, similar elements have a same reference number as shown in FIGS. 2 and 3.

In comparison with layout diagram 300 (shown in FIG. 3), layout diagram 400 also includes second conductive line 406. In some embodiments, second conductive line 406 is first conductive line 106 in FIG. 1. Second conductive line 406 is similar to first conductive line 206 shown in FIG. 2. In some embodiments, second conductive line 406 has the same dimensions and materials as first conductive line 206.

Second conductive line 406 is connected to third interconnect structure 304. Second conductive line 406 is configured to provide an electrical connection between third interconnect structure 304 and other structures (e.g., second interconnect structure 108 shown in FIG. 1). In some embodiments, second conductive line 406 is a metal line, a via, a through silicon via (TSV), an inter-level via (ILV), a slot via, an array of vias, or another suitable conductive line. In some embodiments, second conductive line 406 includes copper, aluminum, nickel, titanium, tungsten, alloys thereof or another suitable conductive material. In some embodiments, second conductive line 406 includes one or more conductive portions.

In some embodiments, second conductive line 406 is over the third interconnect portion 304. In some embodiments, second conductive line 406 is below the third interconnect portion 304. In some embodiments, second conductive line 406 is located on a same interconnect layer as first conductive line 206. In some embodiments, second conductive line 406 is located on a different interconnect layer as first conductive line 206. In some embodiments, second conductive line 406 and first conductive line 206 are configured to provide an electrical connection to the same structures. In some embodiments, second conductive line 406 and first conductive line 206 are configured to provide an electrical connection to different structures. Although FIG. 4 includes two conductive lines (e.g., first conductive line 206 and second conductive line 406), layout diagram 400 is a basis to be modified to form other layout structures including more than two conductive lines.

Figure 5:
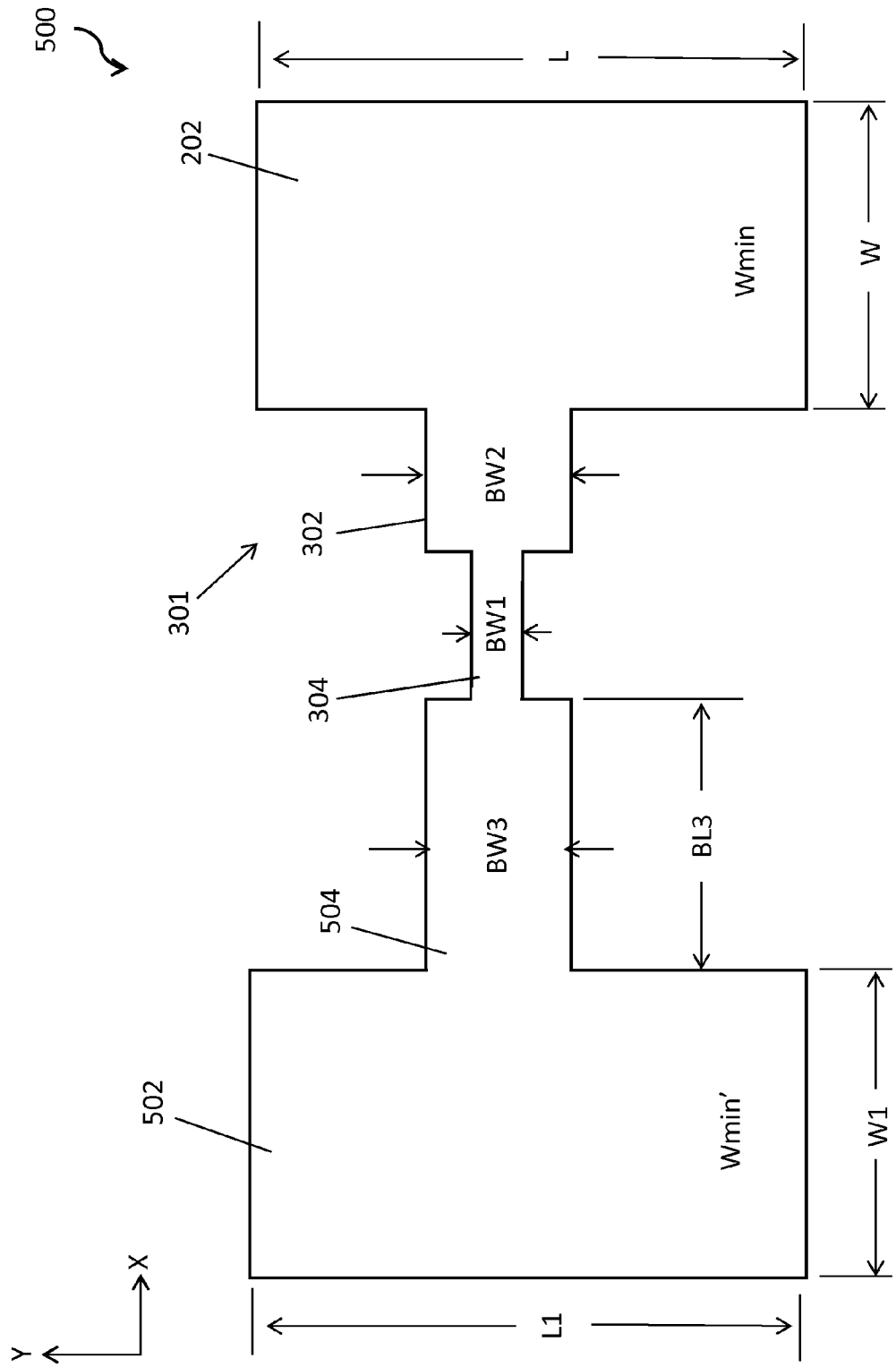
FIG. 5 is a portion of a layout diagram of a semiconductor device in accordance with one or more embodiments.

FIG. 5 is a portion of a layout diagram 500 of semiconductor device in accordance with one or more embodiments. In some embodiments, layout diagram 500 is layout diagram 200 in FIG. 2. In some embodiments, layout diagram 500 is layout diagram 300 in FIG. 3. In some embodiments, layout diagram 500 is layout diagram 400 in FIG. 4. As shown in FIG. 5, similar elements have a same reference number as shown in FIGS. 2 and 3.

In comparison with layout diagram 300 (shown in FIG. 3), layout diagram 500 does not include first conductive line 206.

In comparison with layout diagram 300 (shown in FIG. 3), layout diagram 500 also includes a fourth interconnect portion 502 and a fifth interconnect portion 504.

In some embodiments, fourth interconnect portion 502 is first interconnect portion 106a in FIG. 1. In some embodiments, fourth interconnect portion 502 is first interconnect portion 202 in FIGS. 2-4. In some embodiments, fifth interconnect portion 504 is second interconnect portion 106b in FIG. 1. In some embodiments, fifth interconnect portion 504 is second interconnect portion 204 in FIG. 2. In some embodiments, fifth interconnect portion 504 is second interconnect portion 302 in FIGS. 3-4. In some embodiments, fourth interconnect portion 502 and fifth interconnect portion 504 are second interconnect structure 108 in FIG. 1.

Fourth interconnect portion 502 is connected to first interconnect structure 301 by fifth interconnect portion 504. Fourth interconnect portion 502 is configured to extend in direction Y. Fourth interconnect portion 502 has a width W1 measurable along direction X. In some embodiments, the width W1 of fourth interconnect portion 502 is equal to the width W of first interconnect portion 202. In some embodiments, width W1 is different from width W. Fourth interconnect portion 502 has a length L1 measurable along direction Y. In some embodiments, length L1 is equal to length L. In some embodiments, length L1 is different from length L. Fourth interconnect portion 502 has a minimum design width Wmin' measurable along direction X. The minimum design width Wmin' is the minimum width of the fourth interconnect portion 502 capable of being reliably manufactured for a given technology node size and a consistent manufacturing yield. In some embodiments, the minimum design width Wmin' is defined by a foundry. In some embodiments, the minimum design width Wmin' is defined by a design rule. The minimum design width Wmin' is defined based upon the technology node size. For example, as technology nodes sizes are reduced, the minimum design width Wmin' is also reduced.

In some embodiments, width W1 is greater than minimum width Wmin'. In some embodiments, the width W1 is at least greater than six times a minimum design width Wmin' of the fourth interconnect portion 502 as expressed by formula 5. The width, W1, of fourth interconnect portion 502 is expressed by formula 5:

$$W1 \geq 6*Wmin' \quad (5)$$

where W1 is the width of the fourth interconnect portion 502 and Wmin' is the minimum design width of the fourth interconnect portion 502.

Fifth interconnect portion 504 is directly connected to fourth interconnect portion 502 and first interconnect structure 301. Fourth interconnect portion 502 is located on the same interconnect layer as fifth interconnect portion 504. In some embodiments, fourth interconnect portion 502 and fifth interconnect portion 504 are located on a same interconnect layer as first interconnect structure 301. In some embodiments, at least one of fourth interconnect portion 502 or fifth interconnect portion 504 is on a different level from first interconnect structure 301. In some embodiments, fourth interconnect portion 502 and fifth interconnect portion 504 are integrally formed. In some embodiments, one or more fifth interconnect portions 504 extend from the fourth interconnect portion 502 in direction X. In some embodiments, two or more fifth interconnect portions 504 are arranged in a parallel configuration.

Fifth interconnect portion 504 is configured to extend in direction X. Fifth interconnect portion 504 has a width BW3 measurable along direction Y. In some embodiments, the width BW3 of fifth interconnect portion 504 is equal to at least one of the width BW2 of second interconnect portion 302 or width BW1. In some embodiments, width BW3 is different from at least one of width BW2 or width BW1. In some embodiments, the width BW3 of fifth interconnect portion 504 is less than the length L1 of fourth interconnect portion 502. In some embodiments, the width BW3 is at least greater than 1.5 times the minimum design width Wmin' of the fourth interconnect portion 502 as expressed by formula 6.

The width, BW3, of fifth interconnect portion 504 is expressed by formula 6:

$$BW3 \geq 1.5*Wmin' \quad (6)$$

where BW3 is the width of the fifth interconnect portion 504 and Wmin' is the minimum design width of the fourth interconnect portion 502.

Fifth interconnect portion 504 has a length BL3 measurable along direction X from a side of fifth interconnect portion 504 to a side of fourth interconnect portion 502. In some embodiments, the length BL3 of fifth interconnect portion 504 is equal to the length BL2 of second interconnect portion 302 or length BL1. In some embodiments, length BL3 is different from at least one of length BL2 or length BL1. In some embodiments, the length BL3 is at least greater than one-third of the width W1 of the fourth interconnect portion 502 as expressed by formula 7.

The length, BL3, of fifth interconnect portion 504 is expressed by formula 7:

$$BL3 \geq W1/3 \quad (7)$$

where BL3 is the length of the fifth interconnect portion 504 and W1 is the width of the fourth interconnect portion 502.

In some embodiments, fourth interconnect portion 502 or fifth interconnect portion 504 includes a conductive material. In some embodiments, fourth interconnect portion 502 or fifth interconnect portion 504 includes a metal. In some embodiments, fourth interconnect portion 502 or fifth interconnect portion 504 includes copper, aluminum, nickel, titanium, tungsten, alloys thereof or another suitable conductive material. In some embodiments, fourth interconnect portion 502 or fifth interconnect portion 504 includes one or more conductive portions.

By utilizing the semiconductor device shown in FIG. 1 or one or more layout patterns shown in FIGS. 2-5, SM failure is reduced when compared with layout patterns not utilizing the layout patterns shown in FIGS. 1-5. In some embodiments, SM failure is attributed to the formation of voids underneath a via or within the via (e.g., via-bottom voiding). In some embodiments, SM failure is attributed to the formation of voids in the branch line (e.g., branch-line voiding). In some embodiments, branch-line voiding is attributed to the formation of high-stress gradients in the branch-line. In some embodiments, one or more of the layout patterns shown in FIGS. 1-5 reduces the formation of branch-line voiding or via-bottom voiding. By utilizing one or more layout patterns shown in FIGS. 2-5, a number of grain boundaries formed at the branch line (e.g., 106b, 204, 302, 304)/first interconnect portion (e.g., 106a, 202) interface as a result of stress migration is reduced. In some embodiments, by reducing the number of grain boundaries, the amount of resistance to electron flow is reduced. By utilizing one or more layout patterns shown in FIGS. 1-5, necking, void formation or grain formation is reduced when compared with layout patterns not utilizing the layout patterns shown in FIGS. 1-5.

Figure 6:
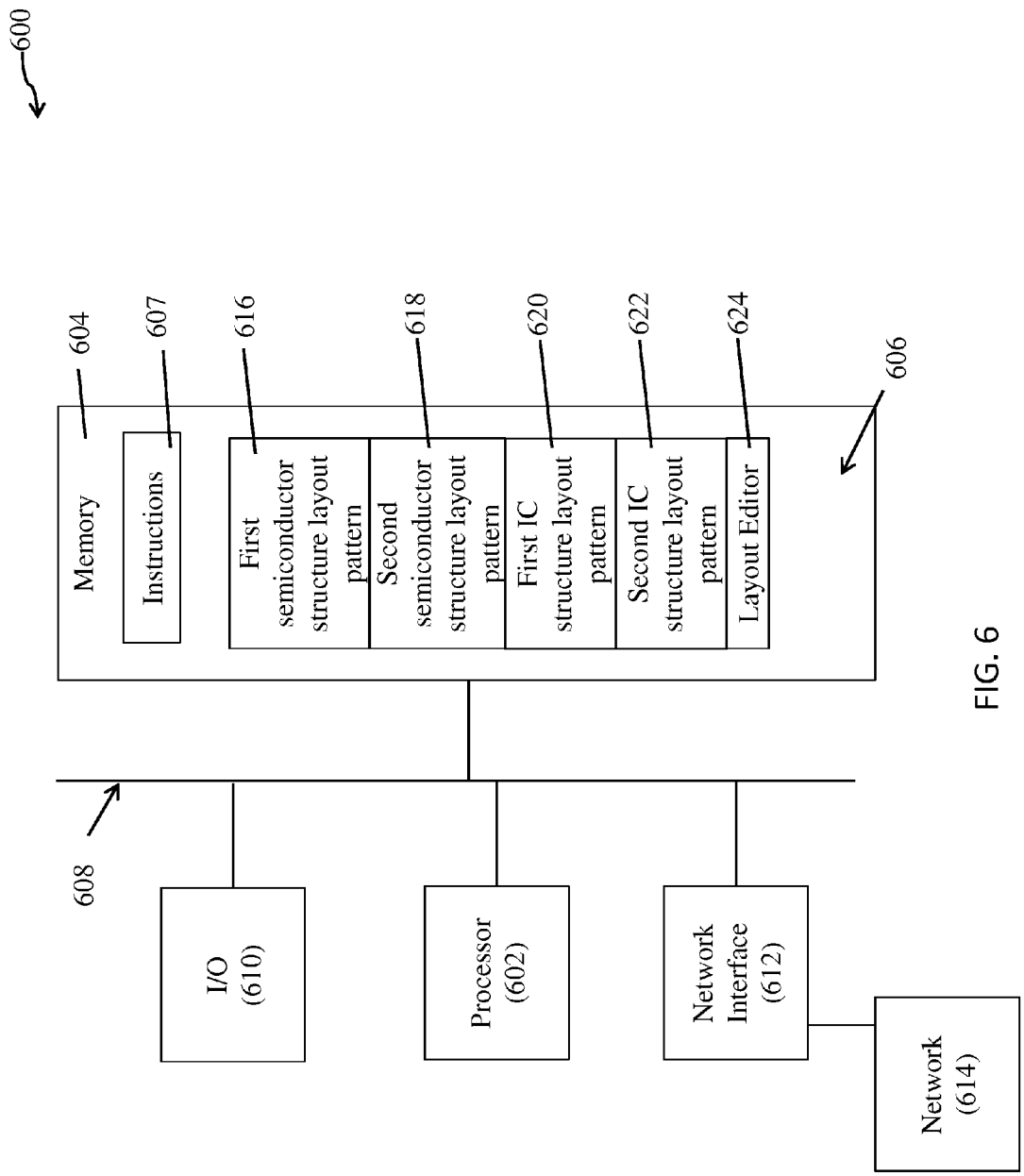
FIG. 6 is a block diagram of a layout generator in accordance with one or more embodiments.

FIG. 6 is a block diagram of a layout generator 600 for designing a semiconductor device in accordance with one or more embodiments. In some embodiments, the layout generator 600 is a specific purpose computing device which implements method 700 of FIG. 7 or method 800 of FIG. 8 in accordance with one or more embodiments. Layout generator 600 includes a hardware processor 602 and a non-transitory, computer readable storage medium 604 encoded with, i.e., storing, the computer program code 606, i.e., a set of executable instructions. Computer readable storage medium 604 is also encoded with instructions 607 for interfacing with manufacturing machines for producing the semiconductor device. The processor 602 is electrically coupled to the computer readable storage medium 604 via a bus 608. The processor 602 is also electrically coupled to an I/O interface 610 by bus 608. A network interface 612 is also electrically connected to the processor 602 via bus 608. Network interface 612 is connected to a network 614, so that processor 602 and computer readable storage medium 604 are capable of connecting to external elements via network 614. The processor 602 is configured to execute the computer program code 606 encoded in the computer readable storage medium 604 in order to cause layout generator 600 to be usable for performing a portion or all of the operations as described e.g., in method 700.

In one or more embodiments, the processor 602 is a central processing unit (CPU), a multi-processor, a distributed processing system, an application specific integrated circuit (ASIC), and/or a suitable processing unit.

In one or more embodiments, the computer readable storage medium 604 is an electronic, magnetic, optical, electromagnetic, infrared, and/or a semiconductor system (or apparatus or device). For example, the computer readable storage medium 604 includes a semiconductor or solid-state memory, a magnetic tape, a removable computer diskette, a random access memory (RAM), a read-only memory (ROM), a rigid magnetic disk, and/or an optical disk. In one or more embodiments using optical disks, the computer readable storage medium 604 includes a compact disk-read only memory (CD-ROM), a compact disk-read/write (CD-R/W), and/or a digital video disc (DVD).

In one or more embodiments, the storage medium 604 stores the computer program code 606 configured to cause layout generator 600 to perform method 700 or 800. In one or more embodiments, the storage medium 604 also stores information needed for performing methods 700 or 800 as well as information generated during performing methods 700 or 800, such as first structure layout pattern 616, second structure layout pattern 618, first metal structure layout pattern 620, second metal structure layout pattern 622, layout editor 624, and/or a set of executable instructions to perform the operation of method 700 or 800.

In one or more embodiments, the storage medium 604 stores instructions 607 for interfacing with external machines. The instructions 607 enable processor 602 to generate instructions readable by the external machines to effectively implement method 700 or 800 during a design process. In some embodiments, the design process is of a semiconductor device including one or more circuit elements.

Layout generator 600 includes I/O interface 610. I/O interface 610 is coupled to external circuitry. In one or more embodiments, I/O interface 610 includes a keyboard, keypad, mouse, trackball, trackpad, touchscreen, and/or cursor direction keys for communicating information and commands to processor 602.

Layout generator 600 also includes network interface 612 coupled to the processor 602. Network interface 612 allows layout generator 600 to communicate with network 614, to which one or more other computer systems are connected. Network interface 612 includes wireless network interfaces such as BLUETOOTH, WIFI, WIMAX, GPRS, or WCDMA; or wired network interfaces such as ETHERNET, USB, or IEEE-1394. In one or more embodiments, method 700 or 800 is implemented in two or more systems 600, and information such as first structure layout pattern 616, second structure layout pattern 618, first metal structure layout pattern 620, second metal structure layout pattern 622, layout editor 624 are exchanged between different systems 600 via network 614.

Layout generator 600 is configured to receive information related to a UI through I/O interface 610. The information is transferred to processor 602 via bus 608 to generate first structure layout pattern. The UI is then stored in computer readable medium 604 as first structure layout pattern 616. Layout generator 600 is configured to receive information related to a second structure layout pattern through I/O interface 610. The information is stored in computer readable medium 604 as second structure layout pattern 618. Layout generator 600 is configured to receive information related to a first metal structure layout pattern through I/O interface 610. The information is stored in computer readable medium 604 as first metal structure layout pattern 620. Layout generator 600 is configured to receive information related to a second metal structure layout pattern through I/O interface 610. The information is stored in computer readable medium 604 as second metal structure layout pattern 622. Layout generator 600 is configured to receive information related to a layout editor through I/O interface 610. The information is stored in computer readable medium 604 as layout editor 624.

Figure 7:
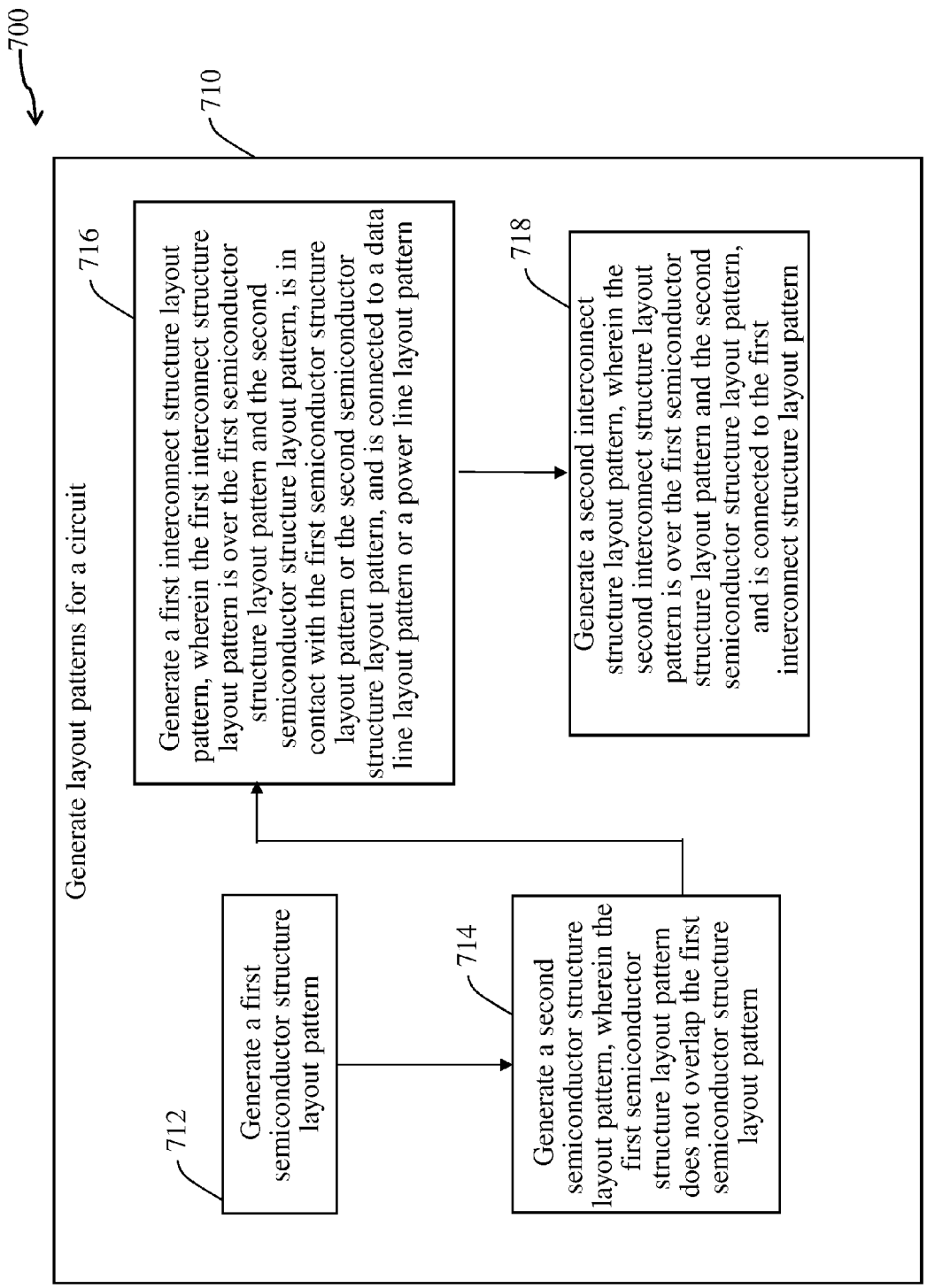
FIG. 7 is a flowchart of a method of generating a layout design in accordance with one or more embodiments.

FIG. 7 is a flowchart of a method 700 of generating a layout design in accordance with one or more embodiments. In some embodiments, method 700 is utilized to generate a layout design for a semiconductor device or a circuit. It is understood that additional operations may be performed before, during, and/or after the method 700 depicted in FIG. 7, and that some other processes may only be briefly described herein. In some embodiments, at least a portion of the method 700 is performed by operating a hardware computer (such as layout generator 600 in FIG. 6).

In operation 710, layout patterns of a circuit, such as layout patterns depicted in FIGS. 1-5, are generated. In some embodiments, the layout patterns of a circuit include one or more layout patterns for forming one or more semiconductor devices.

For example, operation 710 includes generating a first structure layout pattern associated with forming a first structure (e.g., 102 or 104) of the circuit (operation 712), in some embodiments.

Operation 710 further includes generating a second structure layout pattern associated with forming a second structure (e.g., 102 or 104) of the circuit (operation 714), in some embodiments. In some embodiments, the first structure layout pattern does not overlap the second structure layout pattern.

Operation 710 further includes generating a first interconnect structure layout pattern associated with forming a first interconnect structure (e.g., 106, 201, 301) of the circuit (operation 716), in some embodiments. In some embodiments, the first interconnect structure layout pattern is over the first structure layout pattern and the second structure layout pattern. In some embodiments, the first interconnect structure layout pattern is connected to the first structure layout pattern or the second structure layout pattern. In some embodiments, the first interconnect structure layout pattern is connected to a data line layout pattern or a power line layout pattern (e.g., 108 or 110). In some embodiments, operation 710 further includes generating a first interconnect portion layout pattern associated with forming a first interconnect portion (e.g., 106a, 202, 502), a second interconnect portion layout pattern associated with forming a second interconnect portion (e.g., 106b, 204, 302, 504) or a third interconnect portion layout pattern associated with forming a third interconnect portion (e.g., 304). In some embodiments, the relationships described with reference to formulas 1-7 are applicable to one or more of the structures generated by method 700.

Operation 710 further includes generating a second interconnect structure layout pattern associated with forming a second interconnect structure (e.g., 108) of the circuit (operation 718), in some embodiments. In some embodiments, the second interconnect structure layout pattern is over the first structure layout pattern and the second structure layout pattern. In some embodiments, the second interconnect structure layout pattern is connected to the first interconnect structure layout pattern. In some embodiments, the first interconnect structure layout pattern and the second interconnect structure layout pattern are located on a same interconnect layer. In some embodiments, the first interconnect structure layout pattern and the second interconnect structure layout pattern are located on a different interconnect layer. In some embodiments, the first interconnect structure layout pattern is connected to the second interconnect structure layout pattern by at least one via layout pattern. In some embodiments, the first interconnect portion layout pattern and the second interconnect portion layout pattern are arranged in a T-shape or an L-shape.

Figure 8:
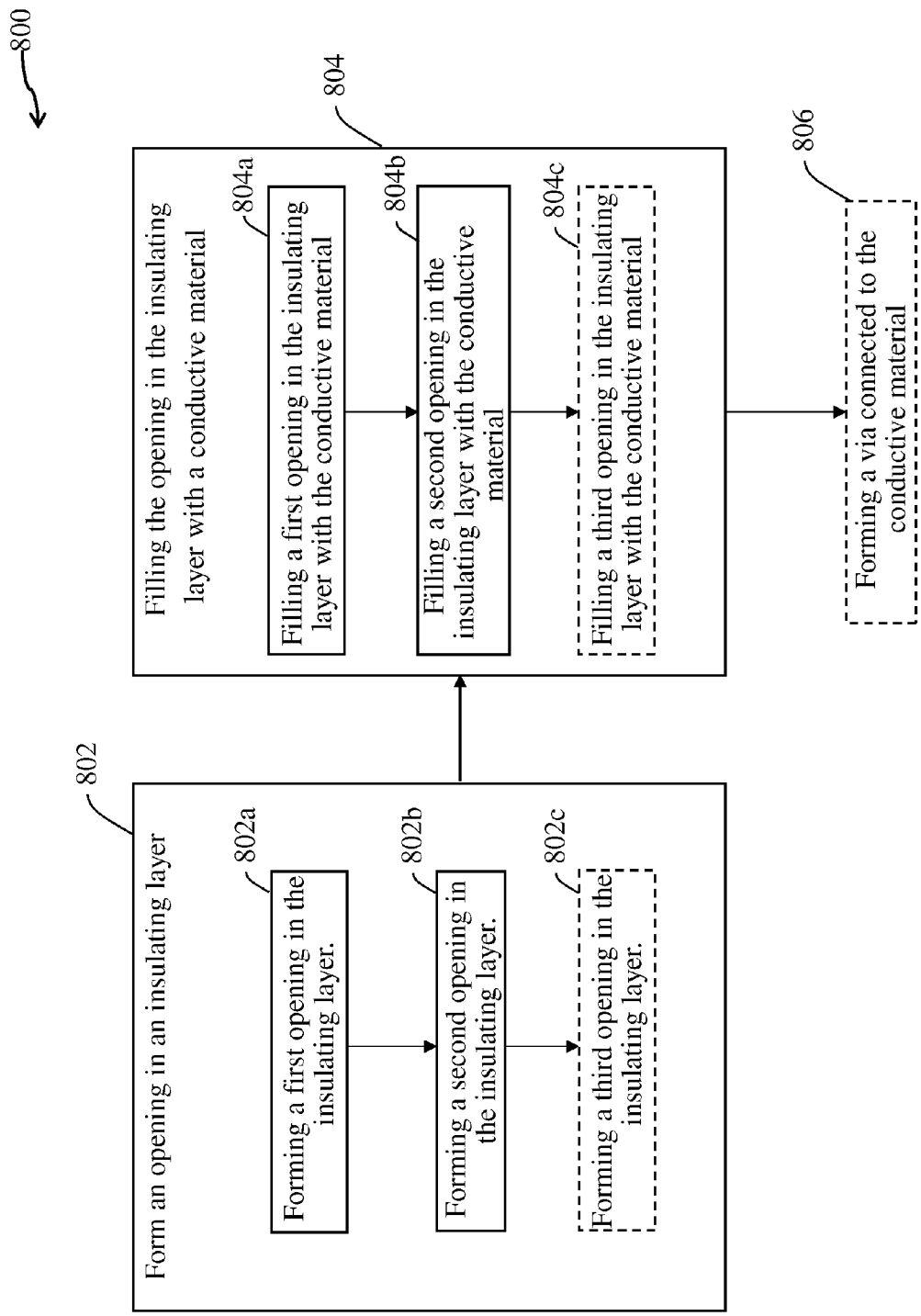
FIG. 8 is a flowchart of a method of making a semiconductor device pattern in accordance with one or more embodiments.

FIG. 8 is a flowchart of a method 800 of a making a semiconductor device in accordance with one or more embodiments. A resulting semiconductor device 100 is obtained as shown in FIG. 1. Additional operations are performed before, during, and/or after the method 800 depicted in FIG. 8, in some embodiments, and that some other processes may only be briefly described herein.

Method 800 begins with operation 802 in which an opening is formed in an insulating layer. In some embodiments, operation 802 includes forming a first opening in the insulating layer (e.g. operation 802a). In some embodiments, operation 802 also includes forming a second opening in the insulating layer (e.g., operation 802b). In some embodiments, operation 802 also includes forming a third opening in the insulating layer (e.g., operation 802c). In some embodiments, operation 802c is optional, where the semiconductor device does not include a third interconnect portion (e.g., 304). In some embodiments, operation 802a is performed simultaneously with at least one of operation 802b or operation 802c. In some embodiments, operation 802a is performed sequentially with at least one of operation 802b or operation 802c. In some embodiments, the opening in the insulating layer of operation 802 is formed by suitable techniques, such as a combination of a photolithography process and a material removal process. In some embodiments, the photolithography process includes forming a hard mask, an antireflective structure, or another suitable photolithography structure. In some embodiments, the material removal process includes a plasma etching process, a wet etching process, a dry etching process, a Reactive Ion Etching (RIE) process, laser drilling or another suitable etching process. In some embodiments, the insulating layer of operation 802 includes materials suitable to electrically insulate the conductive material of operation 804 from other portions of the semiconductor device.

In operation 804, the opening in the insulating layer is filled with a conductive material. In some embodiments, operation 804 includes filling the first opening in the insulating layer with the conductive material (e.g., operation 804a). In some embodiments, operation 804 also includes filling the second opening in the insulating layer with the conductive material (e.g., operation 804b). In some embodiments, operation 804 also includes filling the third opening in the insulating layer with the conductive material (e.g., operation 804c). In some embodiments, operation 802c is optional, where the semiconductor device does not include a third interconnect portion (e.g., 304). In some embodiments, operation 804a is performed simultaneously with at least one of operation 804b or operation 804c. In some embodiments, operation 804a is performed sequentially with at least one of operation 804b or operation 804c. In some embodiments, the conductive material includes one or more of copper, cobalt, aluminum, titanium, nickel, tungsten, or other suitable conductive material. In some embodiments, the opening in the insulating layer is filled using chemical vapor deposition (CVD), physical vapor deposition (PVD), sputtering, plating, atomic layer deposition (ALD) or other suitable formation processes. In some embodiments, a diffusion barrier layer is formed between the conductive material and the insulating layer. In some embodiments, operation 804 also includes a planarizing process, or other suitable process, to remove portions of the conductive material. In some embodiments, the planarizing process includes planarizing a top surface of the conductive material, such that the top surface of the conductive material is coplanar with a top surface of the insulating layer. In some embodiments, the planarizing process includes, for example, a chemical mechanical polish (CMP) process. In some embodiments, after operation 804, a resulting semiconductor device 100 as shown in FIG. 1 is obtained. In some embodiments, after operation 804, a resulting semiconductor device with an interconnect structure similar to that shown in FIGS. 2-5 is obtained.

In operation 806, a via (e.g., 120, 122, 124, 126, 206, 406) is formed connected to the conductive material. In some embodiments, the via is formed in the insulating layer. In some embodiments, another insulating layer is formed over the insulating layer, and the via is formed in the another insulating layer. In some embodiments, the via is formed by suitable techniques, such as a combination of the steps of operation 802 or 804. In some embodiments, operation 806 is optional.

One aspect of this description relates to a semiconductor device including a first interconnect structure. The first interconnect structure includes a first interconnect portion, a second interconnect portion and a third interconnect portion. The first interconnect portion has a width and a length. The second interconnect portion has a width less than the length of the first interconnect portion. The second interconnect portion is connected to the first interconnect portion. The third interconnect portion has a width less than the width of the second interconnect portion. The third interconnect portion is connected to the second interconnect portion.

Still another aspect of this description relates to an integrated circuit designing system, comprising a non-transitory storage medium and a hardware processor communicatively coupled with the non-transitory storage medium and configured to execute a set of instructions. The non-transitory storage medium being encoded with a layout design of a semiconductor device and a set of instructions. The layout design comprising a first interconnect structure layout pattern associated with forming a first interconnect structure of the semiconductor device. The first interconnect structure layout pattern comprises a first interconnect portion layout pattern associated with forming a first interconnect portion of the semiconductor device, a second interconnect portion layout pattern associated with forming a second interconnect portion of the semiconductor device and a third interconnect portion layout pattern associated with forming a third interconnect portion of the semiconductor device. The first interconnect portion layout pattern has a width and a length. The second interconnect portion layout pattern has a width that is less than the length of the first interconnect portion layout pattern. The second interconnect portion layout pattern is connected to the first interconnect portion layout pattern. The third interconnect portion layout pattern has a width less than the width of the second interconnect portion layout pattern. The third interconnect portion layout pattern is connected to the second interconnect portion layout pattern. The set of instructions is for generating an integrated circuit layout based on an original circuit design and the layout design of the circuit.

Yet another aspect of this description relates to a method of making a semiconductor device. The method comprising forming a first opening in an insulating layer, forming a second opening in the insulating layer, forming a third opening in the insulating layer and filling the first opening, the second opening and the third opening with a conductive material. The first opening has a width and a length. The second opening has a width less than the length of the first opening, and is connected to the first opening. The third opening has a width less than the width of the second opening, and is connected to the second opening.

The foregoing outlines features of several embodiments so that those of ordinary skill in the art may better understand the aspects of the present disclosure. Those of ordinary skill in the art should appreciate that they may readily use the present disclosure as a basis for designing or modifying other circuits, processes and structures for carrying out the same purposes and/or achieving the same advantages of the embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor device comprising:
   a first interconnect structure comprising:
      a first interconnect portion having a width and a length;
      a second interconnect portion having a width less than the length of the first interconnect portion, wherein the second interconnect portion is connected to the first interconnect portion; and
      a third interconnect portion having a width less than the width of the second interconnect portion, wherein the third interconnect portion is connected to the second interconnect portion.

2. The semiconductor device of claim 1, wherein the width of the first interconnect portion is at least greater than six times a minimum design width of the first interconnect portion; and
   wherein the width of the second interconnect portion is at least greater than 1.5 times the minimum design width of the first interconnect portion.

3. The semiconductor device of claim 1, wherein the second interconnect portion has a length that is at least greater than one-third of the width of the first interconnect portion.

4. The semiconductor device of claim 1, further comprising:
   a first structure; and
   a second structure, wherein the first structure does not overlap the second structure, and wherein the first interconnect structure is over the first structure and the second structure, is connected to the first structure or the second structure.

5. The semiconductor device of claim 1, further comprising a second interconnect structure connected to the first interconnect structure.

6. The semiconductor device of claim 5, wherein the first interconnect structure and the second interconnect structure are located on a same interconnect layer.

7. The semiconductor device of claim 6, wherein the second interconnect structure comprises:
   a fourth interconnect portion having a length, and
   a fifth interconnect portion having a width, wherein the fifth interconnect portion is connected to the third interconnect portion and the fourth interconnect portion, wherein the width of the fifth interconnect portion is less than the length of the fourth interconnect portion.

8. The semiconductor device of claim 5, wherein the first interconnect structure and the second interconnect structure are located on a different interconnect layer, and the first interconnect structure is connected to the second interconnect structure by at least one via.

9. The semiconductor device of claim 1, wherein the first interconnect portion, the second interconnect portion and the third interconnect portion are arranged in an L-shape, a T-shape or a comb shape.

10. An integrated circuit designing system, comprising:
    a non-transitory storage medium, the non-transitory storage medium configured to store a layout design of a semiconductor device and a set of instructions, the layout design comprising:
       a first interconnect structure layout pattern associated with forming a first interconnect structure of the semiconductor device, wherein the first interconnect structure layout pattern comprises:
          a first interconnect portion layout pattern associated with forming a first interconnect portion of the semiconductor device, wherein the first interconnect portion layout pattern has a width and a length;

a second interconnect portion layout pattern associated with forming a second interconnect portion of the semiconductor device, wherein the second interconnect portion layout pattern has a width that is less than the length of the first interconnect portion layout pattern, and wherein the second interconnect portion layout pattern is connected to the first interconnect portion layout pattern; and a third interconnect portion layout pattern associated with forming a third interconnect portion of the semiconductor device, wherein the third interconnect portion layout pattern has a width less than the width of the second interconnect portion layout pattern, wherein the third interconnect portion layout pattern is connected to the second interconnect portion layout pattern;

wherein the set of instructions is for generating an integrated circuit layout based on an original circuit design and the layout design of the semiconductor device; and a hardware processor communicatively coupled with the non-transitory storage medium and configured to execute the set of instructions.

11. The integrated circuit designing system of claim 10, wherein the set of instructions is for generating that the width of the first interconnect portion layout pattern is at least greater than six times a minimum design width of the first interconnect portion layout pattern; and wherein the set of instructions is for generating that the width of the second interconnect portion layout pattern is at least greater than 1.5 times the minimum design width of the first interconnect portion layout pattern.

12. The integrated circuit designing system of claim 11, wherein the set of instructions is for generating that the second interconnect portion layout pattern has a length that is at least greater than one-third of the width of the first interconnect portion layout pattern.

13. The integrated circuit designing system of claim 10, wherein the layout design further comprises a second interconnect structure layout pattern associated with forming a second interconnect structure of the semiconductor device, wherein the second interconnect structure layout pattern is connected to the first interconnect structure.

14. The integrated circuit designing system of claim 13, wherein the set of instructions is for generating that the second interconnect structure layout pattern comprises:

a fourth interconnect portion layout pattern associated with forming a fourth interconnect portion of the semiconductor device, wherein the fourth interconnect portion layout pattern has a length, and a fifth interconnect portion layout pattern associated with forming a fifth interconnect portion of the semiconductor device, wherein the fifth interconnect portion layout pattern has a width, wherein the fifth interconnect portion layout pattern is connected to the third interconnect portion layout pattern and the fourth interconnect portion layout pattern, wherein the width of the fifth interconnect portion layout pattern is less than the length of the fourth interconnect portion layout pattern.

15. The integrated circuit designing system of claim 13, wherein the set of instructions is for generating that the first interconnect structure layout pattern and the second interconnect structure layout pattern being located on a different interconnect layer, and wherein the set of instructions is for generating that the first interconnect structure layout pattern being connected to the second interconnect structure layout pattern by at least one via layout pattern.

16. The integrated circuit designing system of claim 13, wherein the set of instructions is for generating that the first interconnect structure layout pattern, the second interconnect structure layout pattern and the third interconnect structure layout pattern are arranged in an L-shape, a T-shape or a comb shape.

17. A semiconductor device comprising:

a first interconnect portion having a first width and a first length;

a second interconnect portion having a second width and a second length, wherein the second length is less than the first length, and the second interconnect portion is connected to the first interconnect portion;

a third interconnect portion having a third width and a third length, wherein the third length is less than the second length, and the third interconnect portion is connected to the second interconnect portion;

a fourth interconnect portion having a fourth width and a fourth length, wherein the fourth length is greater than the third length, and the fourth interconnect portion is connected to the third interconnect portion; and a fifth interconnect portion having a fifth width and a fifth length, wherein the fifth length is greater than the fourth length, and the fifth interconnection portion is connected to the fourth interconnect portion.

18. The semiconductor device of claim 17, wherein the fifth width is equal to the first width.

19. The semiconductor device of claim 17, further comprising a first via connected to the third interconnect portion, wherein a dimension of the first via is equal to the third length.

20. The semiconductor device of 19, further comprising a second via connected to the third interconnect portion.

* * * * *